United States Patent [19]
Bilezikjian et al.

[11] Patent Number: 5,320,308
[45] Date of Patent: Jun. 14, 1994

[54] SEATBACK BREAKOVER DEVICE

[75] Inventors: Vahe Bilezikjian, Denton; Steve R. Bell, Lindsay, both of Tex.

[73] Assignee: Weber Aircraft, Inc., Gainesville, Tex.

[21] Appl. No.: 802,112

[22] Filed: Dec. 4, 1991

[51] Int. Cl.⁵ ............................................. B64D 11/06
[52] U.S. Cl. .................................. 244/122 R; 297/216.1
[58] Field of Search ........................ 244/122 R, 118.5; 297/379, 216, 378, 393, 399

[56] References Cited
U.S. PATENT DOCUMENTS

| | | | |
|---|---|---|---|
| 4,236,750 | 12/1980 | Moritz | 297/216 |
| 4,394,047 | 7/1983 | Brunelle | 244/122 R |
| 4,488,754 | 12/1984 | Heesch et al. | 297/216 |

*Primary Examiner*—Galen L. Barefoot
*Attorney, Agent, or Firm*—Lyon & Lyon

[57] ABSTRACT

A seatback fitting assembly is provided with means to allow the complete forward rotation of the seatback, while remaining anchored to the seat structure, upon an excessive dynamic load or force impact on the seatback. This is accomplished by the use of a structural "breakover" device operating within the fitting assembly, which restrains the seatback within a limited, "forward tilt" range of motion under normal conditions, but allows complete forward rotation once load forces above an allowable level act on the seatback to cause a restraining pin to shear. A friction brake or clutch arrangement is provided to inhibit tilting of the seatback at all times but does not prevent the complete forward rotation of the seatback.

1 Claim, 3 Drawing Sheets

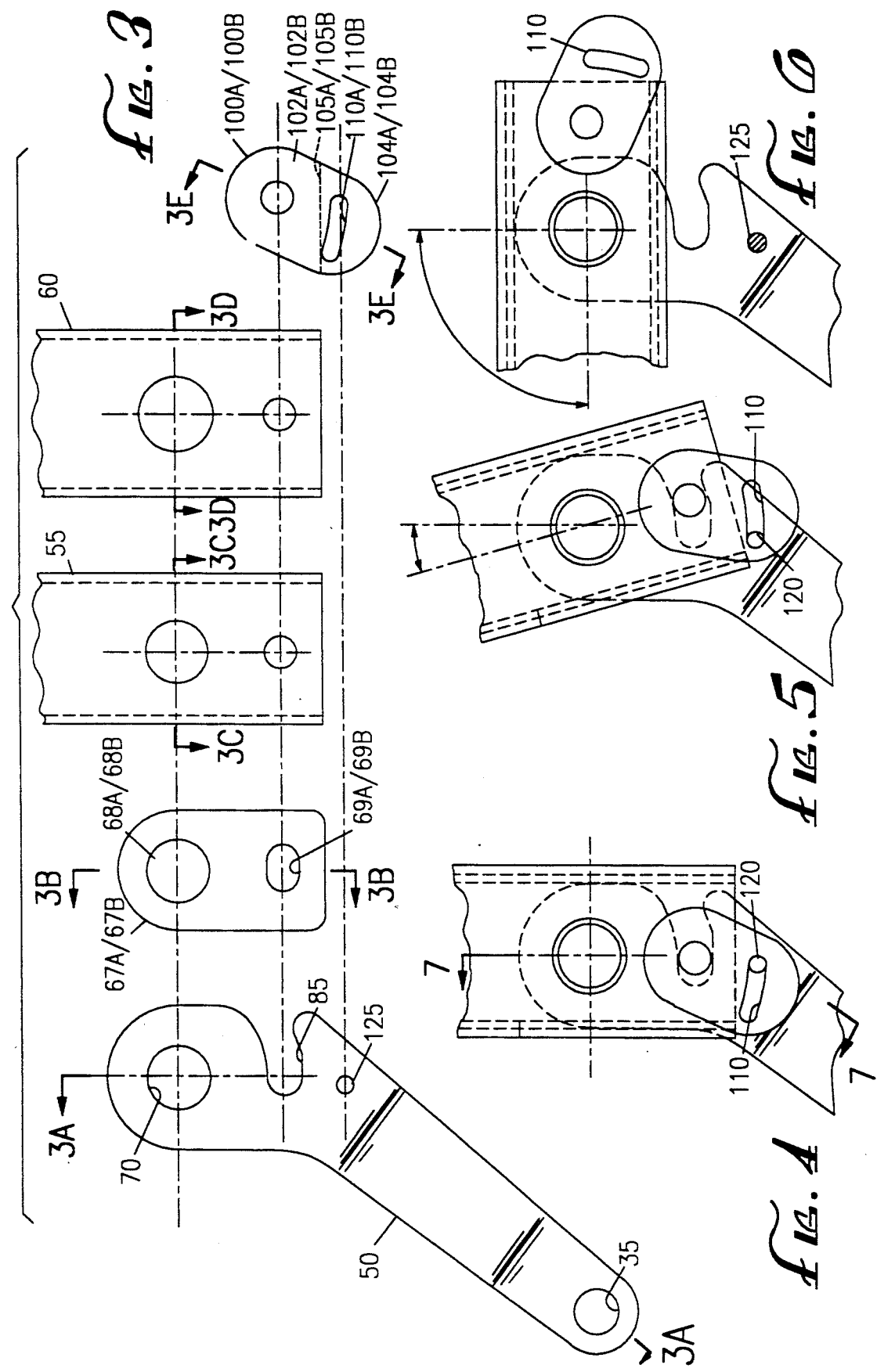

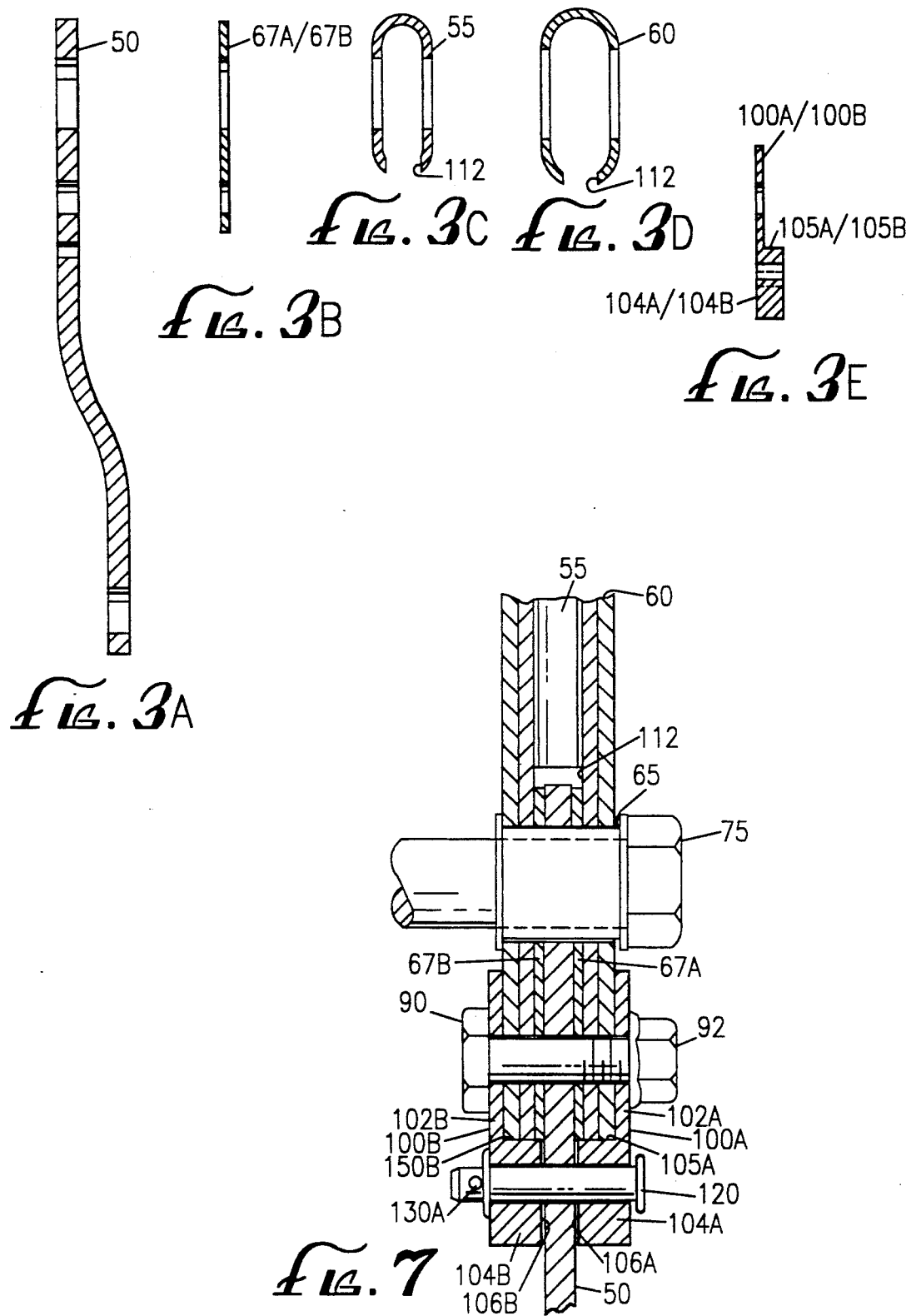

SEATBACK BREAKOVER DEVICE

BACKGROUND OF THE INVENTION

This invention relates to fitting assemblies for anchoring aircraft passenger seatbacks to seat structures and more particularly, to a device which allows the seatback to rotate freely towards the seat structure, while remaining anchored to it, upon the application of an excessive external force on the seatback.

Seatback fitting assemblies must be safe, reliable and capable of positioning a passenger for comfort and safety for the duration of a flight. Under normal operating conditions, the entire seat configuration is subject to various loads and external forces, such as the weight and movement of an occupying passenger, or contact from others behind or near the seat.

Excessive dynamic loads on the seatback during a severe crash condition often exceed the structural strength required for normal operation and can contribute to the structural failure of the seatback. Further, under such crash conditions, the seatback is subject to being forcefully struck from behind by the head and/or body of another passenger, adding to any excessive dynamic load already acting on it. When such failure occurs, the seatback breaks off from the seat structure and carries itself dangerously into the cabin area. The torn seatback can become a missile causing serious injury, possibly lacerating passengers due to jagged edges formed in the torn anchorage. It could also hamper rapid evacuation of the aircraft. Thus, it is desireable that the seat remain structurally sound and that the seatback be capable of withstanding any excessive forces and remain anchored to the seat structure.

A variety of seatback fitting assemblies exist in the prior art. It is known for the fitting assemblies to have means for the seatback to be tilted forward within a limited range of motion, typically around fifteen degrees. This is accomplished by the use of a friction clutch, which normally retains the seatback in a fixed position, but may be overcome by a force exerted upon the seatback. The seatback may then be moved forward until the clutch mechanism prevents further tilt, typically by means of an "anchor point." This "tilt capability" is useful to expedite cleaning of the aircraft cabin, e.g., a cleaning crew member merely pushes the top of the seatback to move it into a forward tilt position, without needing to unlock the seatback from the fitting assembly. However, the seatback anchorage of those seats which feature this limited forward tilt capability may fail at load levels substantially lower than those experienced in a severe crash.

The present invention is directed at eliminating the safety problems experienced in the prior art due to the structural failure of seatbacks caused by excessive dynamic loads and/or passenger impacts under severe crash or similar conditions. Further, the present invention reduces the potential injuries to the occupant of a seat behind the seatback of this invention by limiting the reaction load experienced by such occupant impacting the seatback.

SUMMARY OF THE INVENTION

According to the invention, a seatback fitting assembly is provided with means to allow the complete forward rotation of the seatback, while remaining anchored to the seat structure, upon an excessive dynamic load or force impact on the seatback. This is accomplished by the use of a structural "breakover" device operating within the fitting assembly, which restrains the seatback within a limited, "forward tilt" range of motion under normal conditions, but allows complete forward rotation once load forces above an allowable level act on the seatback.

In a specified embodiment, an airline passenger seat has a pair of seatback fitting assemblies on either side of the seatback, each substantially a mirror image of the other. Each fitting assembly comprises an arm member fixed to the seat structure, which has integral to it a shear pin which acts as a guide for the forward tilt rotation of the seatback. Integral with the seatback is a channel structure including restraining slots of a fixed length. The channel structure pivots about the arm member, wherein the slots "travel" along the shear pin.

Under normal operation, once the seatback has rotated forward to a limited "forward tilt" position, the slots have travelled their full length and stop against the respective shear pins, which prevent further forward motion of the seatback. However, should an excessive force act on the seatback, such as impact from a passenger behind the seatback in a severe crash, the load is translated to the shear pins, which fail in shear and break off. The seatback will then rotate freely beyond the parameters defined by the slots, until restrained by the seat structure itself, a passenger therein, or the seatback in front of it.

The shear pins are designed with predetermined properties, e.g., according to material strength and cross-sectional area, such that they will fail by shear at a determinable applied load. Because the shear pins are designed to fail at much lower load levels than the overall fitting assembly, the seatback will remain anchored to the seat structure and not pose a further safety threat to passengers.

The fitting assembly has a friction brake or clutch mechanism, in which the amount of force necessary to move the seatback may be set by applying torque on a bolt. This "brake-force" load is that which is needed to tilt the seatback, but is substantially less that required for the shear pins to fail. As such, once the shear pins fail, the seatback is still capable of being placed in its fixed, non-tilting upright position. In the aftermath of the crash, the friction brake or clutch still operates and the seatback can be readily rotated into any position required for rapid egress by manually moving the back at the "brake-force" level in the same way that the cleaning crew returns the seatback to its non-tilting position after cleanup. Once it is back in an upright position, the friction brake will retain it, as under normal operation.

When subjected to G-loads during a crash condition, the instant invention reduces the impact load on a rear passenger, whose head and/or body strikes the seatback. This is because loads above a safe predetermined load would be instantly attenuated by the break-away device causing the seat back to lean forward at "breakover force". Thus, loads to the rear occupant may be reduced to a predetermined load level, followed by the smaller brake-force as set by the pre-torque on the friction brake or clutch mechanism.

Because it is desireable to improve the safety of passenger aircraft as quickly as reasonably possible, another object of the invention is to have means which allow the shear pin and slot apparatus to be retrofitted into existing seatback anchor fitting assemblies used in current, in-service airline seats, in addition to those constructed for new aircraft. Other and further objects and advantages will appear hereinafter.

BRIEF DESCRIPTION OF THE DRAWINGS

The features of a specific embodiment of the best mode contemplated of carrying out the invention are illustrated in the accompanying drawings, in which:

FIG. 3 is an exploded side elevation of the fitting assembly.

FIGS. 3a–e show a cross section of each of the elements shown in FIG. 3, each taken along the lines 3a–e, respectively, as indicated.

FIGS. 4–6 show a detailed side elevation of the fitting assembly, each illustrating a different stage of the operation of the present invention.

FIG. 7 is a cross section taken along lines 7—7 of FIG. 4.

DETAILED DESCRIPTION OF THE SPECIFIC EMBODIMENT

Figure 1:
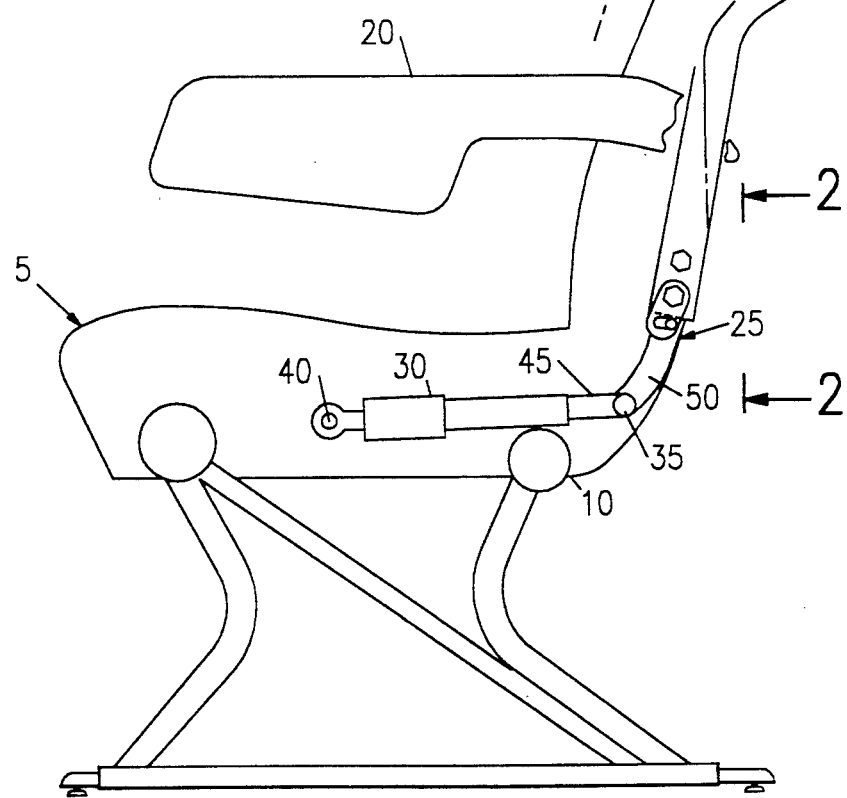
FIG. 1 is a side elevation of an airline passenger seat employing the embodiment of the present invention in a fitting assembly.

Referring now to FIG. 1, there is shown a conventional passenger seat 5, comprising seat structure 10, seatback 15, armrest 20, and fitting assembly 25. The fitting assembly is attached to a conventional hydraulic lock adjusting mechanism 30, at pin 35. The hydraulic lock is secured to the seat structure at pin 40. The hydraulic lock operates to retract or extend member 45, which acts as a counter lever on fitting assembly arm 50. Arm 50 is attached to the seatback, as described below, such that the retracting of member 45 causes the seatback to rotatably recline away from the seat structure. Likewise, extending member 45 causes the seatback to return to its normal forward position (A). Operation of the hydraulic lock is controlled by the passenger, typically from the armrest.

Some seats feature a "tilt capability," as does the specified embodiment, in which the fitting assembly has means for the seatback to be tilted forward within a limited range of motion, typically between zero to fifteen degrees. A phantom of the seatback in the forward tilt position is shown at (B). This feature is generally useful for cleaning the passenger cabin area. The means for the tilt capability are described below.

Figure 2:
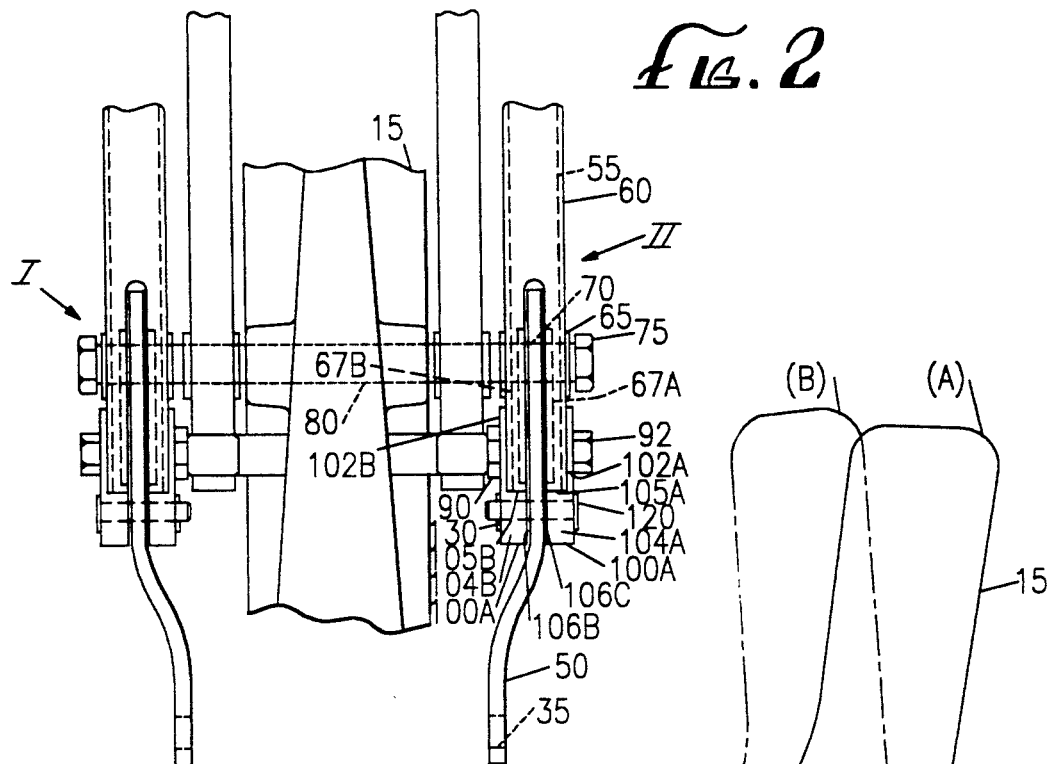
FIG. 2 is a rear elevation taken along lines 2—2 of FIG. 1, displaying a configuration of two adjacent fitting assemblies, as they are typically used for two adjacent passenger seats and the support therebetween.

Referring now to FIG. 2, two adjacent fitting assemblies I and II, which are substantially mirror images of each other, are shown for supporting sides of adjacent seatbacks 15. Each fitting assembly has an arm 50 mounted within a seatback channel structure 55, of which there are two for each seatback. In the embodiment shown, straddling channel structure 60 substantially surrounds seatback channel 55. The straddling channel structure provides structural reinforcement where the invention is retrofitted into an existing seatback configuration and, as a result, the seatback channel structure has been weakened. Both structures are herein referred to as the "seatback channel structure."

Arm 50 is retained within the seatback channel structure by means of circular bushing or collar 65, which is affixed within the walls of the channel structure, and passes through holes 68a and 68b of friction plates 67a and 67b, respectively, and hole 70 in arm 50. Holes 68a, 68b and 70 (best seen in FIG. 3) are substantially circular and have a diameter slightly greater than the outside diameter of collar 65. As such, collar 65 may freely rotate within hole 70, providing a vehicle for the seatback channel structure to rotate about arm 50. Friction plates 67a and 67b (best seen in FIG. 3) straddle both sides of arm 50 within the seatback channel structure, minimizing any translation movement about arm 50, and also providing controlled slippage with arm 50 and other components hereafter described. The friction plates are kept in their normal positions by collar 65 and bolt 90 (described below).

Bolt 75 passes through circular collar 65 and is attached to or integral with support member 80, which is positioned between adjacent seats and between fitting assemblies I and II. Support member 80 is integral with or mounted on the seat transverse support structure which in turn is attached to the seat legs that affix the seat to the floor of the aircraft.

Referring now to FIGS. 2, 3 and 7, bolt 90 passes through a pair of external lugs 100a and 100b, through the walls of the channel structure 55 and 60, through slotted holes 69a and 69b in friction plates 67a and 67b, respectively, and through open slot 85 in arm 50. A lock nut 92 of the type that will not become inadvertently unthreaded, such as a surelock nut, is fastened onto bolt 90, with or without washers (not shown) between the head of bolt 90 and lug 100b and between nut 92 and lug 100a.

As best seen in FIG. 7, tightening of lock nut 92 onto bolt 90 results in increasing pressure exerted among all of the components including against the friction plates 67a and 67b, which in turn compress against both sides of arm 50. The increased compression pressure makes it increasingly difficult to rotate the seatback. In this manner, applying torque to bolt 90 creates a "friction brake or clutch" between arm 50 and friction plates 67a and 67b for controllably restraining or easing the rotation of the seatback about arm 50.

Returning now to FIGS. 2, 3 and 7, lugs 100a and 100b have thin upper body portions 102a and 102b, respectively, and thicker lower body portions 104a and 104b, respectively, which extend beyond the end of the seatback channel structure. Lower body portions 104a and 104b have surfaces 105a and 105b, respectively, which substantially cover the open end of both the seatback channel structure and the friction plates 67a and 67b. As assembled flush against opposing channel structure walls and tightened by bolt 90 and nut 92, body portions 104a and 104b have opposing surfaces, 106a and 106b, respectively. The gap left between opposing surfaces 106a and 106b provides a space for the arm 50. The seatback channel structure (members 55 and 60) has a corresponding space or opening 112 cut in it above the gap between surfaces 106a and 106b to allow rotation of all the components relative to the arm 50.

Shear pin 120 passes through closed slots 110a and 110b of lugs 100a and 100b, respectively, and through hole 125 in arm 50. Hole 125 has a diameter as to snugly fit shear pin 120, such that arm 50 will cause sheer pin 120 to remain stationary within slots 110a and 110b. The shear pin is held in place by cotter pin 130 (FIG. 2) which is placed through hole 130a (FIG. 7) near the end of the shear pin.

Referring now to FIGS. 4, 5 and 7, the forward tilt capability is accomplished when a sufficient forward force is applied to the seatback as to overcome the "brake-force," i.e., the force necessary to overcome the compressive friction force exerted on arm 50 by friction plates 67a and 67b. The brake-force causes the seatback and the seatback channel structure to rotate about arm 50, pivoting on collar 65. More specifically, collar 65 will rotate within hole 70 of arm 50, which remains fixedly attached to the seat structure.

The rotation of the seatback channel structure causes friction lugs 100a and 100b to rotate as well, since the end of the channel structure abuts surfaces 105a and 105b, pushing the lugs along with the seatback and causing slots 110a and 110b to slide along shear pin 120, which is fixed to arm 50 in hole 125. Once the seatback has tilted forward approximately fifteen degrees, the slots will have moved so that the shear pin stops against the ends of the slots and prevents further movement of the seatback (FIG. 5). As the seatback rotates forward, open slot 85 allows bolt 90 to rotate with the seatback channel structure.

Now comparing FIGS. 5 and 6, when a force is applied to the seatback above the "brake-force," such that the seatback has reached its maximum forward tilt position, the force translates through the seatback and fitting assembly and the shear pin bears the entire load. If that load reaches a predetermined level, such as that caused by excessive dynamic loads under a severe crash condition and/or being struck from behind by another passenger, the shear pin (or, if desired, one shear pin in each of the two fitting assemblies on either side of the seatback) will fail and shear, breaking off from arm 50. No longer restrained by the shear pin, the seatback will "breakover" completely and freely rotate beyond the fifteen degree limited tilt angle shown in FIG. 5 to a full, approximately 90 degree, forward swing, as shown in FIG. 6. This complete rotation is resisted only by the "brake-force" of the friction clutch or brake. In the aftermath of the crash, the seatback can be readily rotated into any position required for rapid egress by manually moving the back by only the "brake-force" level, in the same way that the cleaning crew moves the seatback during cleanup. Furthermore, the seatback 15 cannot be moved rearwardly beyond the normal upright position (A) shown in FIG. 1 because the bolt 90 engages the end of the slot 85, thereby preventing the seatback from injuring or becoming an obstruction for the occupant of the seat behind that seatback.

The full "breakover" feature may also be useful during non-crash operation. The shear pin(s) may be manually removed by removing cotter-pin 130. Such a feature is advantageous for certain conditions when the aircraft is not in operation, such as during cleaning or when transporting large bundles, packages or equipment over the tops of the seats. The full "breakover" feature also accommodates overhead stretcher installations when the seats are not occupied and therefore allows for the quick conversion into a flying ambulance.

When subjected to G-loads during a crash condition, the present invention reduces the impact loads on a rear passenger striking the seatback, since loads above a safe predetermined load would be instantly attenuated by shearing off pin 120, thereby causing the seat back to pivot forward, acting only at "brake-force". Thus, loads to the rear occupant are reduced to the safe predetermined load level, followed by the smaller brake-force set by the pre-torque on bolt 90, at collar 65.

The described embodiment of the invention is only considered to be preferred and illustrative of the inventive concept; the scope of the invention is not to be restricted to such embodiment. Various and numerous other arrangements may be devised by one skilled in the art without departing from spirit and scope of this invention. For example, although this specified embodiment of the invention utilizes a shear pin as means for allowing the seatback to "break-away" and tilt forward, other means are also available. These include, but are not limited to, the use of an electromagnetic or hydraulic trigger, or an electromechanical means, or a combination thereof as a replaceable or renewable "fuse" to function in a manner similar to the described shear pin. While the invention is directed to use in airline passenger seats, it may be equally useful for seats on high-speed trains, or other passenger transportation vehicles. Further, while the described seatback anchor fitting assembly is utilized on only one side of a single passenger seatback, other embodiments of the present invention may use a shear pin or equivalent means on both sides of the seat for the seatback break-away function.

What is claimed is:

1. An assembly mechanism for anchoring seatbacks to seat structures comprising:
   a circular collar integral with the seatback and inserted through a hole at one end of an arm member, the other end of said arm member being fixed to the seat structure, such that the collar may rotate within the hole and the seatback rotate about the arm member;
   a shear pin mounted on said arm member which abuts a structural element integral with the seatback and restrains further rotation when the seatback has been rotated to a limited forward tilt position relative to the seat structure, wherein
   the shear pin will fail in shear allowing full forward rotation of the seatback once a force of a predetermined magnitude is exerted on the seatback; and further comprising
   a cotter-pin retaining the shear pin in place, wherein the cotter-pin may be manually removed for allowing the shear pin to be manually removed.

* * * * *